United States Patent [19]

Nagae

[11] Patent Number: 5,694,566
[45] Date of Patent: Dec. 2, 1997

[54] MEMORY PATCHING DEVICE

[75] Inventor: Takaaki Nagae, Kawasaki, Japan

[73] Assignee: Fujitsu Limited, Kawasaki, Japan

[21] Appl. No.: 721,385

[22] Filed: Sep. 26, 1996

Related U.S. Application Data

[63] Continuation of Ser. No. 113,746, Aug. 31, 1993, abandoned.

[30] Foreign Application Priority Data

Feb. 12, 1993 [JP] Japan ................................. 5-023146

[51] Int. Cl.$^6$ .................... G06F 12/00; G06F 9/26; G06F 9/32; G06F 12/02
[52] U.S. Cl. ................ 395/401; 395/412; 395/442; 395/421.1; 395/828; 395/182.03; 395/182.04; 395/182.05
[58] Field of Search ................ 395/401, 412, 395/442, 421.1, 182.03, 182.04, 182.05, 828

[56] References Cited

U.S. PATENT DOCUMENTS 4,028,684   6/1977   Divine et al. ................ 340/172.5

*Primary Examiner*—Robert W. Downs
*Assistant Examiner*—Than V. Nguyen
*Attorney, Agent, or Firm*—Staas & Halsey

[57] ABSTRACT

A memory patching device for a computer system is provided which temporarily changes part of an object program. A patch table containing patch information associated with each data to be patched is stored in storage means. Patch information retriever retrieves patch information associated with an object program from the patch table when the object program is started. Address calculator calculates an absolute address in a main memory of data of the object program to be patched, based on a base address in the main memory at which the object program is loaded, and an offset address contained in the retrieved patch information. A patcher patches data stored at the calculated absolute address of the main memory, based on patch data contained in the retrieved patch information. The patch information retriever, the address calculator, and the patcher constitute a patch library which is contained in the object program.

10 Claims, 6 Drawing Sheets

21 PATCH TABLE

| | DL | ID | OA | PD |
|---|---|---|---|---|
| 221 | 08 | APL1 | 000E | EB |
| 222 | 0C | APL1 | 0200 | F0, F1, F2, F3, F4 |
| 223 | 09 | AOS1 | 0050 | 90, 90 |
| 22n | 08 | APLn | 124F | EB |
| | 211 | 212 | 213 | 214 |

| | | | | | | | | | | | | | | | | |
|---|---|---|---|---|---|---|---|---|---|---|---|---|---|---|---|---|
| 0100 | B8 | 6F | 13 | BA | AC | 06 | 8C | DB | 03 | D8 | 3B | 1E | 02 | 00 | 73 | 1D |
| 0110 | 83 | EB | 20 | FA | 8E | D3 | BC | 00 | 02 | FB | 83 | EB | 25 | 8E | C3 | 53 |
| 0120 | B9 | 23 | 01 | 33 | FF | 57 | BE | 48 | 01 | FC | F3 | A5 | CB | B4 | 09 | BA |
| 0130 | 36 | 01 | CD | 21 | CD | 20 | 4E | 6F | 74 | 20 | 65 | 6E | 6F | 75 | 67 | 68 |
| 0140 | 20 | 6D | 65 | 6F | 72 | 79 | 24 | FD | 8C | CD | DB | 53 | 83 | C3 | 39 | 03 |
| 0150 | DA | BE | FE | FF | 8B | FE | 8C | CD | 8B | C5 | 2B | EA | 8B | CA | 80 | FD |
| 0160 | 10 | 72 | 03 | B9 | 00 | 10 | 2B | D1 | D1 | E1 | D1 | E1 | 80 | EC |
| 0170 | 10 | 80 | EF | 10 | 8E | C0 | 8E | DB | F3 | A5 | 85 | D2 | 75 | DE | FC | 8E |

| | |
|---|---|
| 0100 | B86F13 |
| 0103 | BAAC06 |
| 0106 | 8CDB |
| 0108 | 03D8 |
| 010A | 3B1E0200 |
| 010E | 731D |
| 0110 | 83EB20 |
| 0113 | FA |

| | |
|---|---|
| MOV | AX,136F |
| MOV | DX,06AC |
| MOV | BX,DS |
| ADD | BX,AX |
| CMP | BX,[0002] |
| JNB | 012D |
| SUB | BX,+20 |
| CLI | |

FIG. 5(A)

| | | | | | | | | | | | | | | | |
|---|---|---|---|---|---|---|---|---|---|---|---|---|---|---|---|
| 0100 | B8 | 6F | 13 | BA | AC | 06 | 8C | DB | 03 | D8 | 3B | 1E | 02 | 00 | EB 1D |
| 0110 | 83 | EB | 20 | FA | 8E | D3 | BC | 00 | 02 | FB | 83 | EB | 25 | 8E | C3 53 |
| 0120 | B9 | 23 | 01 | 33 | FF | 57 | BE | 48 | 01 | FC | F3 | A5 | CB | B4 | 09 BA |
| 0130 | 36 | 01 | CD | 21 | CD | 20 | 4E | 6F | 74 | 20 | 65 | 6E | 6F | 75 | 67 68 |
| 0140 | 20 | 6D | 65 | 6D | 6F | 72 | 79 | 24 | FD | 8C | DB | 53 | 83 | C3 | 39 03 |
| 0150 | DA | BE | FE | FF | 8B | FE | 8C | CD | 8B | C5 | 2B | EA | 8B | CA | 80 FD |
| 0160 | 10 | 72 | 03 | B9 | 00 | 10 | 2B | D1 | D1 | E1 | D1 | E1 | 80 | E1 | 80 EC |
| 0170 | 10 | 80 | EF | 10 | 8E | C0 | 8E | DB | F3 | A5 | 85 | D2 | 75 | DE | FC 8E |

FIG. 5(B)

| | |
|---|---|
| 0100 | B86F13 |
| 0103 | BAAC06 |
| 0106 | 8CDB |
| 0108 | 03D8 |
| 010A | 3B1E0200 |
| 010E | EB1D |
| 0110 | 83EB20 |
| 0113 | FA |

| | | |
|---|---|---|
| MOV | AX, | 136F |
| MOV | DX, | 06AC |
| MOV | BX, | DS |
| ADD | BX, | AX |
| CMP | BX, | [0002] |
| JMP | | 012D |
| SUB | BX, | +20 |
| CLI | | |

MEMORY PATCHING DEVICE

This application is a continuation of application number Ser. No. 08/113,746, filed Aug. 31, 1993, now abandoned.

BACKGROUND OF THE INVENTION (1) Field of the Invention

The present invention relates to a memory patching device for a computer system, and more particularly, to a memory patching device for automatically changing part of an object program stored in a main memory.

(2) Description of the Related Art

Binary-coded object programs executable by a computer system are created in the following manner. First, source programs are compiled using a compiler, to prepare object modules. Then, using a linker, the object modules are combined with necessary libraries to produce object programs.

Object programs created in this manner are generally constructed in a dynamically relocatable fashion. Thus, when an object program stored in an external storage such as a hard disk is executed, an operating system (OS) loads the object program into the main memory while relocating the object program, or more specifically, while converting address information contained in the object program. The OS then sets registers in the processor necessary to execute the object program.

In cases where a created object program contains a bug, or some constant value or the like to be corrected, the object program need be temporarily modified without changing the source program. Such operation, or temporary change of part of an object program, is called "patching."

Patching an object program, however, requires expert knowledge of computer systems. Therefore, usually a patch program is supplied to common users of computer systems so that object programs requiring correction can be automatically patched by the patch program, thus allowing users to remove bugs or correct constant values etc.

Conventionally, the patch program is separate from an object program, and the object program is patched by one of the following two methods:

In the first method, an object program stored in the external storage or the like is directly patched. Namely, the object program is patched before it is loaded into the main memory.

In the second method, when an object program is loaded into the main memory, the patch program retrieves patch information associated with the object program, from patch information stored in the external storage or the like, and patches the object program in accordance with the retrieved patch information, as disclosed in Unexamined Japanese Patent Publication (KOKAI) No. 63-115234.

Thus, bugs, erroneous constant values or the like in object programs can be automatically corrected without troubling users of computer systems.

However, in the first method, the patch process must be monitored all the time to determine whether the object program requires patching, and if the monitoring is carried out improperly, the patch process fails to be executed. Thus, the monitoring consumes labor.

The second method poses no particular problem if the object program is loaded statically in the main memory. In many of existing computers, however, object programs are dynamically linked, and the addresses of object programs change when the programs are loaded into the main memory. Thus, the location of data of an object program to be patched changes, making the patch process unfeasible.

SUMMARY OF THE INVENTION

A first object of the present invention is to provide a memory patching device which facilitates the management of patch process.

A second object of the present invention is to provide a memory patching device capable of reliably patching object programs which are dynamically linked.

To achieve the above objects, there is provided a memory patching device for a computer system which temporarily changes part of an object program. The memory patching device comprises storage means storing a patch table which contains patch information associated with each data to be patched, patch information retrieving means contained in an object program as part of a patch library, for retrieving patch information associated with the object program from the patch table stored in the storage means when the object program is started, address calculating means contained in the object program as part of the patch library, for calculating an absolute address in a main memory of data of the object program to be patched, based on a base address in the main memory at which the object program is loaded, and an offset address contained in the retrieved patch information, and patching means contained in the object program as part of the patch library, for patching data stored at the calculated absolute address of the main memory, based on patch data contained in the retrieved patch information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a chart illustrating an example of a patch table;

FIG. 4(A) is a chart showing an example of a data dump before patch process;

FIG. 4(B) is a chart showing an example of a data dump, together with machine language instructions, before patch process;

FIG. 5(A) is a chart showing an example of a data dump after the patch process;

FIG. 5(B) is a chart showing an example of a data dump, together with machine language instructions, after the patch process.

DESCRIPTION OF THE PREFERRED EMBODIMENTS

An embodiment according to the present invention will be first outlined.

Figure 1:
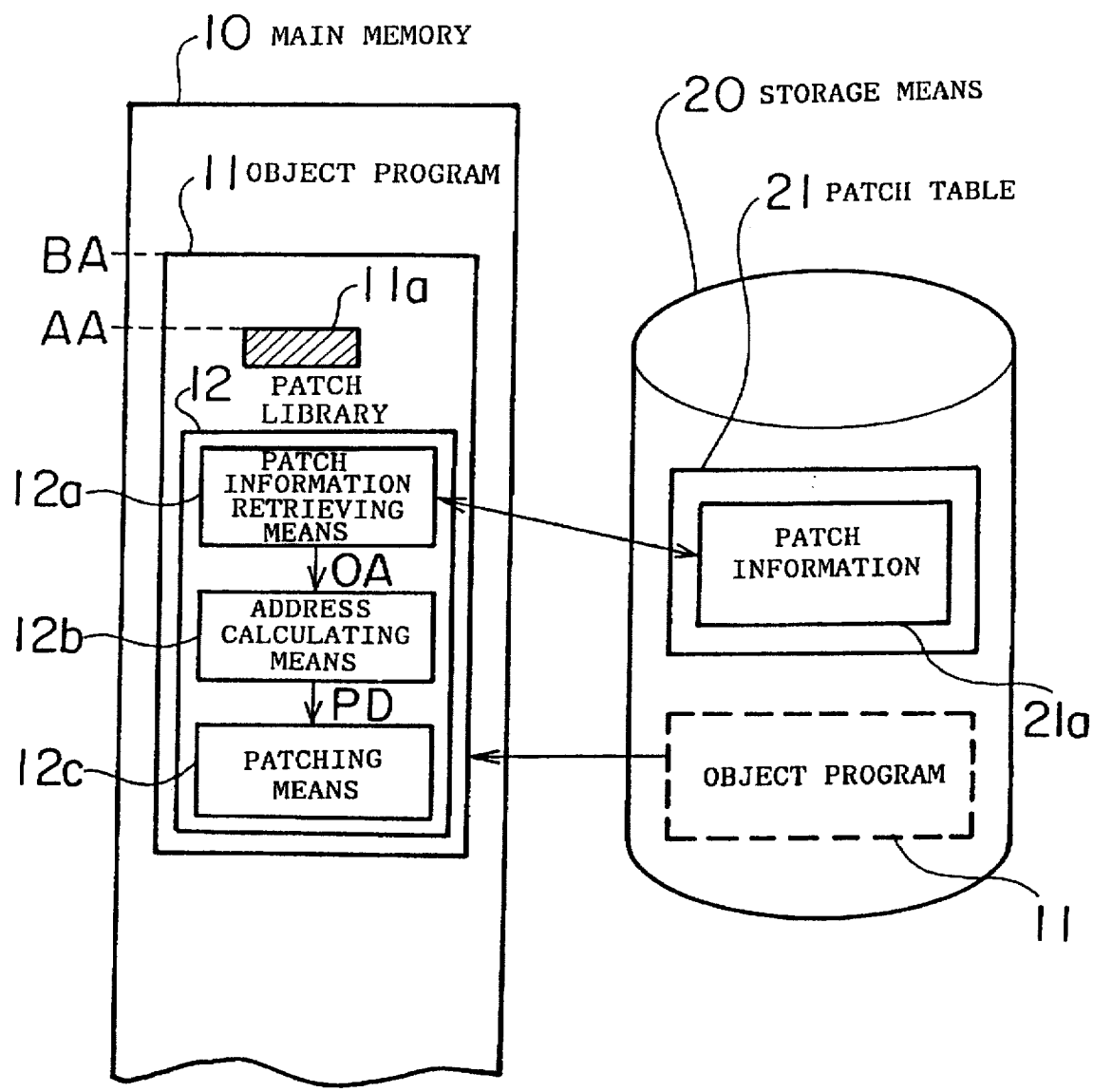
FIG. 1 is a diagram illustrating principles employed in an embodiment of the present invention.

FIG. 1 illustrates the principles underlying the embodiment of the invention. As shown in FIG. 1, a patch library 12, which is composed of patch information retrieving means 12a, address calculating means 12b and patching means 12c, is contained in an object program 11. The object program 11 is at first stored in storage means 20, and is transferred to a main memory 10 when it is to be executed. A patch table 21 contains a plurality of pieces of patch information individually associated with data to be patched, and is stored in the storage means 20.

When the object program 11 is transferred to the main memory 10 and started, the patch information retrieving means 12a retrieves patch information 21a associated with the object program 11 from the patch table 21 stored in the storage means 20.

Based on a base address BA at which the object program 11 is loaded into the main memory 10 and an offset address OA contained in the patch information 21a retrieved by the patch information retrieving means 12a, the address calculating means 12b calculates an absolute address AA in the main memory 10 of data 11a of the object program 11 to be patched. Then, the patching means 12c patches the data 11a stored at the absolute address AA, using patch data PD contained in the patch information 21a.

The object program 11 may be an OS (operating system) program, a memory-resident program loaded into the lain memory 10, such as a device driver, an application program, etc., and the patch library 12 is previously contained in the individual programs. The patch library carries out the patch process when the corresponding object program is started. The patch table 21 contains patch information related to all of the programs.

Consequently, the patch process can be managed easily, and can be reliably performed on the object program even if the loading address in the main memory of the object program changes due to dynamic link.

Hardware of a computer system including the memory patching device described above will be now described.

Figure 2:
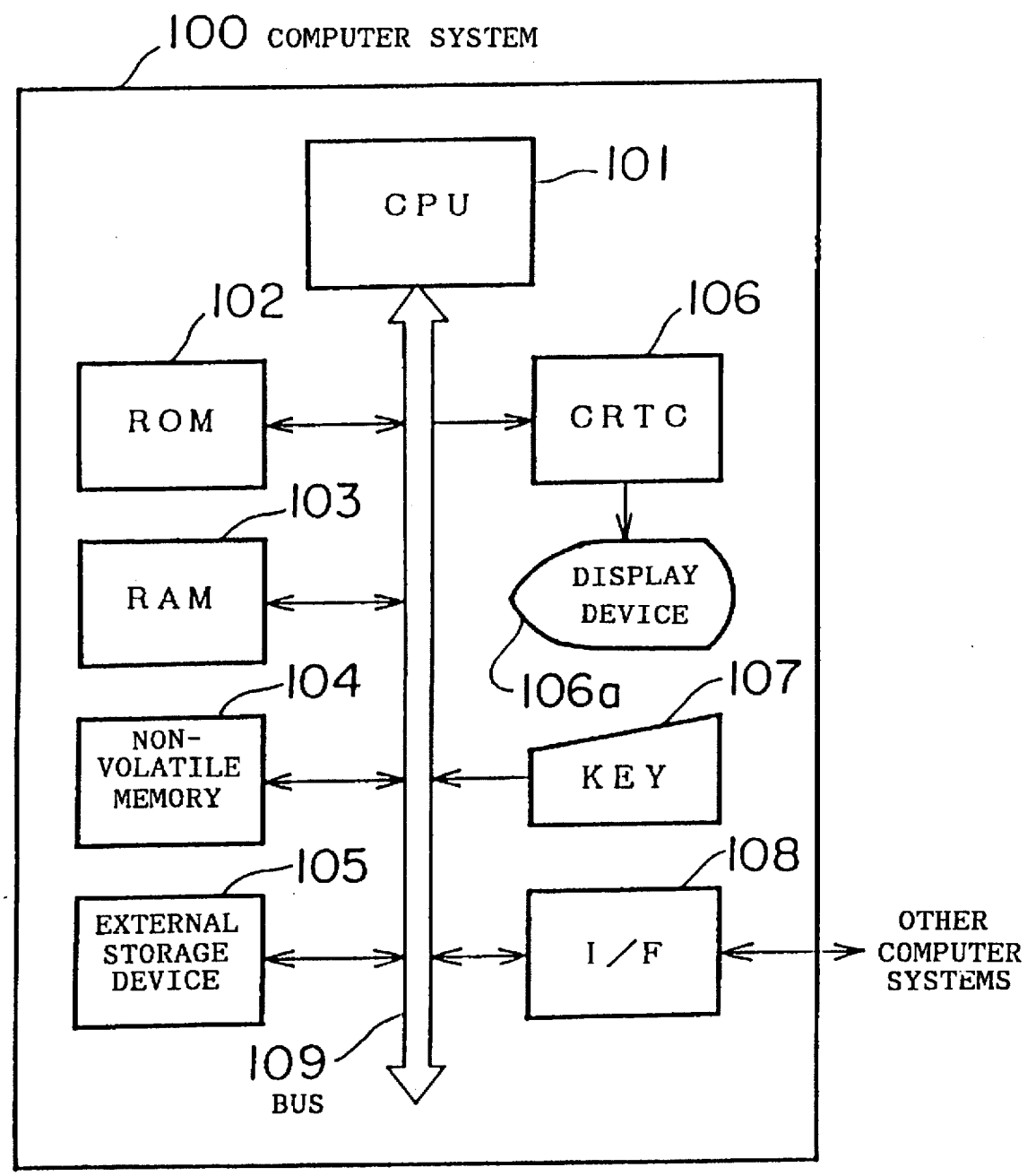
FIG. 2 is a block diagram showing an example of hardware arrangement of a computer system.

FIG. 2 is a block diagram showing an example of hardware arrangement of such a computer system. A computer system 100, which is a workstation or a personal computer, comprises various hardware components including a processor (hereinafter referred to as "CPU") 101, a ROM 102, a RAM 103, a nonvolatile memory 104, an external storage device 105, a CRT control circuit (CRTC) 106, a display device 106a, an operator control panel (KEY) 107, and an interface (I/F) 108.

The CPU 101 globally controls the computer system 100 in accordance with system programs stored in the ROM 102. An EPROM, EEPROM or the like is used for the ROM 102.

The RAM 103 comprises a DRAM, for example, and stores temporary data such as work data, and input/output signals. For the nonvolatile memory 104, a CMOS-RAM backed up by a battery (not shown) is used, for storing data that must be retained even after the power is cut off, such as system information. The external storage device 105, which may be any one of a hard disk drive unit, a magneto-optic disk drive unit and a flexible disk drive unit, stores various data including object programs and the patch table. Namely, the external storage device 105 corresponds to the storage means 20 shown in FIG. 1.

The functions of the patch information retrieving means 12a, address calculating means 12b and patching means 12c, shown in FIG. 1, are accomplished by executing corresponding processing programs in an object program stored in the external storage device 105 by the CPU 101.

The CRT control circuit 106 controls the screen display and converts digital signals into video signals, which are then supplied to the display device 106a. The display device 106a comprises a CRT or liquid-crystal display device. The operator control panel 107 comprises a keyboard, mouse or the like. The interface 108 controls communications with other computer systems etc. The aforementioned components, except for the display device 106a, are connected to a bus 109.

FIG. 3 shows an example of the patch table. The patch table 21 comprises variable-length records each composed of four items. Specifically, the patch table 21 is made up of data length DL (column 211), identifier ID (column 212), offset address OA (column 213), and patch data PD (column 214).

Fixed-length data is set for each of the data length DL, identifier ID and offset address OA, while variable-length data is set for the patch data PD. The data DL, OA and PD are expressed in hexadecimal notation. One of rows 221 to 22n includes data corresponding to the patch information 21a shown in FIG. 1.

Each data length DL in column 211 has a fixed length of, e.g., one byte, and specifies the record length of the patch information.

Each identifier ID in column 212 has a fixed length of four bytes and includes an identification code for identifying an object program to be patched. For the identification code, a filename of the corresponding object program, expressed in ASCII character string, is used as shown in FIG. 3.

Each offset address OA in column 213 has a fixed length of two bytes and includes data which represents a location in the object program to be patched, by way of a relative address with respect to a predetermined address of the object program. The predetermined address is an address in the main memory 10 at which a predetermined part (e.g., head) of the object program 11 is loaded, i.e., the base address BA.

Each patch data PD in column 214 has a variable length and includes actual correction data representing the contents of patching. The data length of the patch data PD is given by subtracting the lengths of the data length data DL, identifier ID and offset address OA from the data length DL. For example, in the case where the data DL has a length of one byte, the identifier ID has a data length of four bytes, and the offset address OA has a data length of two bytes, then the data length of the patch data PD e.g., row 221, is given by subtracting the lengths of the data length data, identifier and offset address from the length "8" specified by the data length data DL, namely, 8−1−4−2=1 (byte).

In the patch table 21 configured as above, the row 221, for example, specifies "08" as the data length DL, "APL1" as the identifier ID, "000E" as the offset address OA, and "EB" as the patch data PD. This means that, in the object program having the filename "APL1", the one-byte data beginning at the offset address "000E" should be corrected to "EB".

Referring now to specific data shown in FIGS. 4(A)–(B) and 5(A)–(B), the operation according to this embodiment will be described.

FIGS. 4(A)–(B) illustrate part of an unpatched object program with the filename "APL1", wherein FIG. 4(A) shows a data dump, and FIG. 4(B) shows machine language instructions, together with the data dump.

In FIG. 4(A), memory addresses 410 represent addresses (absolute addresses) in the main memory 10, and data 420 represents the object program with the filename "APL1" stored in the main memory 10. Alphanumeric data appearing in the figure is expressed in hexadecimal notation.

Addresses are assigned to the data 420 serially from left column to right column of each row and from the uppermost row to the succeeding rows, and each memory address 410 specifies the address of the leftmost column in the corresponding row of the data 420 by means of one-byte data. Accordingly, in row 401, for example, data "B8" is stored at address "0100" of the main memory 10, data "6F" is stored at address "0101", and data "ID" is stored at address "010F". In the illustrated case, the head address "0100" of the object program is used as the base address BA.

In FIG. 4(B), memory address 430 corresponds to the above memory address 410, and data 440 corresponds to the data 420 and is expressed also in mnemonic codes. The mnemonic codes 450 represent the data 440 in terms of machine language instructions. Alphanumeric data appearing in the figure is expressed in hexadecimal notation, except for the machine language instructions in the mnemonic codes 450, such as "MOV" and "AX".

In FIG. 4(B), line 402, for example, indicates that two-byte data "731D" beginning at address "010E" represents the machine language instruction "JNB 012D".

Provided that the object program 11 shown in FIG. 1 has the filename "APL1", for example, when the object program 11 is started, the patch information retrieving means 12a first searches the patch table 21 shown in FIG. 3 and finds patch information associated with the object program 11 at row 221 (FIG. 3). Based on the offset address OA "000E" in the patch information thus found and the base address BA "0100", an absolute address AA "010E " in the main memory 10 associated with the data to be patched is calculated. Then, using the patch data PD "EB" in the patch information at row 221, data storing means 11c corrects the data "73", stored at the absolute address AA "010E", to "EB". The object program patched in this manner is shown in FIGS. 5(A)-(B).

FIGS. 5(A)-(B) part of the patched object program with the filename "APL1", wherein FIG. 5(A) illustrates a data dump, and FIG. 5(B) illustrates machine language instructions, together with the data dump.

Specifically, the data "73" (indicated by rectangle 421 in FIG. 4(A)) at address "010E" is patched and thus changed to data "EB" (indicated by rectangle 521 in FIG. 5(A)) at the same address "010E". As a result, the machine language instruction "JNB 012D" at line 402 of FIG. 4(B) changes to "JNP 012D", as shown in line 501 of FIG. 5(B). In this manner, bugs or erroneous constant values contained in the object program 11 can be reliably corrected.

The procedure for the patch process will be now described with reference to the flowchart of FIG. 6.

Figure 6:
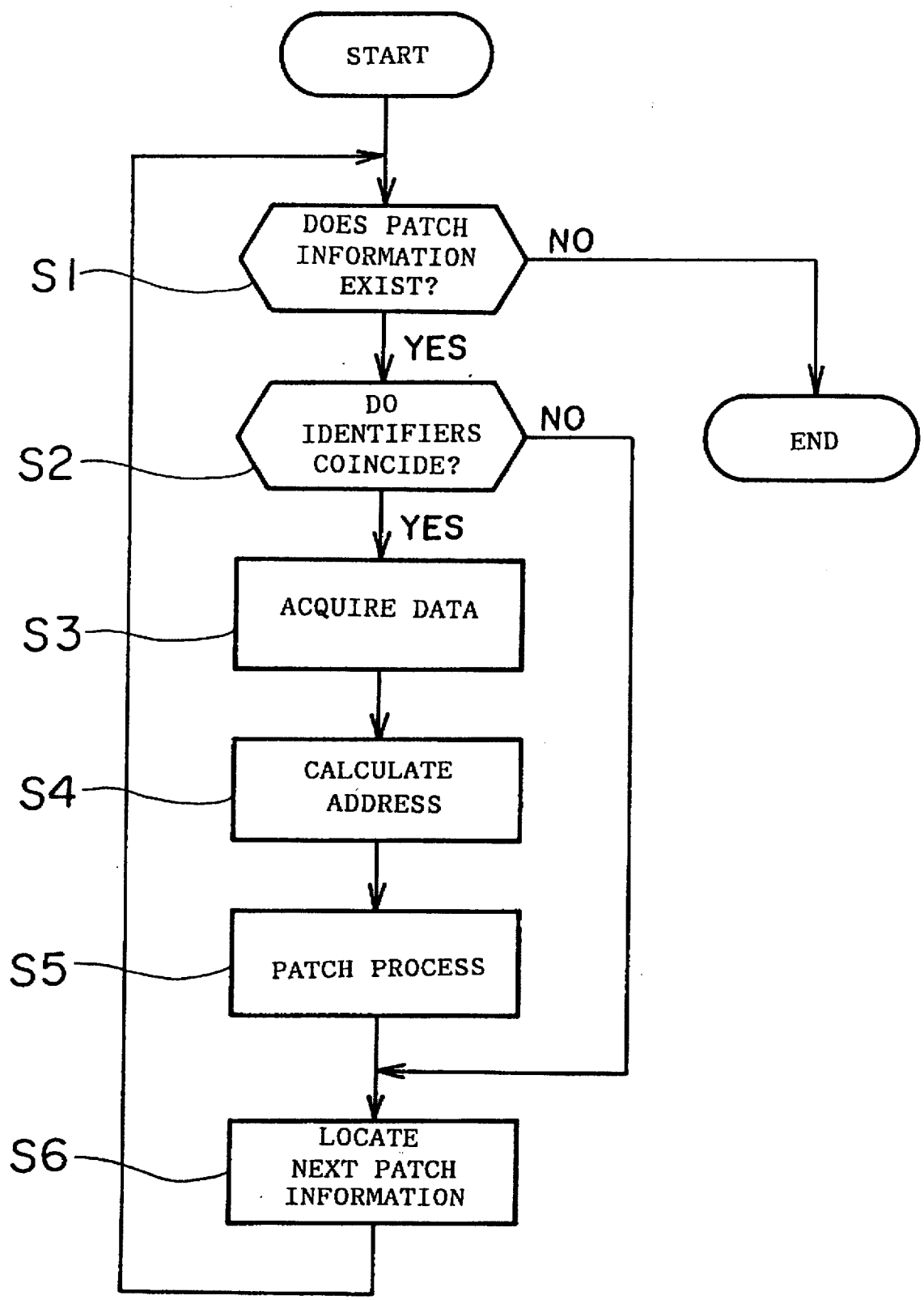
FIG. 6 is a flowchart illustrating a procedure for the patch process.

FIG. 6 shows the procedure for the patch process according to this embodiment. The patch process is executed when each of the object programs is started. The following description is based on the assumption that the object program 11 shown in FIG. 1 has been started. FIG. 6, numbers following "S" denote step numbers. Steps S1 to S3 are executed by the patch information retrieving means 12a, Step S4 is executed by the address calculating means 12b, and Steps S5 and S6 are executed by the patching means 12c.

[S1] It is determined whether the patch table 21 contains patch information associated with the object program 11. If such patch information exists (YES), the flow proceeds to Step S2, and if not (NO), the patch process ends and the object program 11 is executed.

[S2] It is determined whether the identifier ID in the patch information found in Step S1 coincides with the identifier (filename) of the object program 11. If the identifiers coincide (YES), the flow proceeds to Step 3, and if not (NO), the flow proceeds to Step S6.

[S3] The offset address OA and patch data PD in the patch information found in Step S1 are acquired.

[S4] Address calculation is performed. Specifically, the absolute address AA of data in the object program 11 to be patched is obtained by adding up the address in the main memory 10 at which the predetermined part (e.g., head) of the object program 11 was loaded, i.e., the base address BA, and the offset address OA obtained in Step S3.

[S5] The data of the object program 11, stored at the absolute address AA obtained in Step S4, is patched by using the patch data PD acquired in Step S3.

[S6] Other patch information in the patch table 21 is located. Specifically, the record number for referring to the subsequent record is incremented, and then the flow returns to Step S1.

As described above, each of the object programs has a patch library, and is patched if it is determined that the patch process is required when started, whereby the management of the patch process is facilitated.

Further, since the patch table contains offset addresses, the patch process can be reliably carried out even in the case where object programs are dynamically linked.

In the above embodiment, the external storage device 105 shown in FIG. 2 is used as the storage means 20 shown in FIG. 1, but the nonvolatile memory 104, for example, may alternatively be used for the purpose. In this case, the nonvolatile memory 104 can be accessed faster than the external storage device 105, and the patch table 21 and other data are not lost even if an accident such as power failure occurs.

Furthermore, the storage means 20 may be constituted by another computer system connected via a communication line, unlike the foregoing embodiment. For example, if the patch table and like data are stored in a networked host computer system, then all computer systems connected to the network can carry out the patch process according to the present invention. In this case, the memory space required for carrying out the embodiment can be minimized.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A memory patching device in a computer system, for changing part of an object program, comprising:
   a main memory having a plurality of addresses;
   a dynamically relocatable object program, having a base address, which is dynamically relocatable within the plurality of addresses in said main memory and includes a patch library;
   storage means for storing patch information to be patched into the object program;

patch information retrieving means, contained in said object program as part of the patch library, for retrieving the patch information from said storage means;

address calculating means, contained in said object program as part of the patch library, for calculating an absolute address in said main memory based on the base address of the object program and an offset address contained in the retrieved patch information;

patching means, contained in said object program as part of the patch library, for patching the retrieved patch information into the calculated absolute address of the main memory to thereby patch the object program; and means for executing the patched object program.

2. The memory patching device according to claim 1, wherein said object program comprises an application program.

3. The memory patching device according to claim 1, wherein said object program comprises an operating system (OS) program.

4. The memory patching device according to claim 1, wherein said object program comprises a resident program including a device driver.

5. The memory patching device according to claim 1, wherein said storage means comprises a nonvolatile memory.

6. The memory patching device according to claim 1, wherein said storage means comprises another computer system connected to the computer system via a communication line.

7. The memory patching device according to claim 1, wherein said storage means comprises a flexible disk drive unit.

8. The memory patching device according to claim 1, wherein said storage means comprises a hard disk drive unit.

9. The memory patching device according to claim 1, wherein said storage means comprises a magneto-optic disk drive unit.

10. The memory patching device according to claim 1, wherein said patch information includes at least an identifier for identifying the object program and said offset address.

* * * * *